United States Patent

Chen

(10) Patent No.: US 11,775,687 B2
(45) Date of Patent: *Oct. 3, 2023

(54) METHOD FOR AUTHORIZING FIELD VALUE OF FORM FIELD BY MEANS OF THIRD PARTY FIELD

(71) Applicant: CHENGDU QIANNIUCAO INFORMATION TECHNOLOGY CO., LTD., Sichuan (CN)

(72) Inventor: Dazhi Chen, Meishan (CN)

(73) Assignee: CHENGDU QIANNIUCAO INFORMATION TECHNOLOGY CO., LTD., Sichuan (CN)

(*) Notice: Subject to any disclaimer, the term of this patent is extended or adjusted under 35 U.S.C. 154(b) by 408 days.

This patent is subject to a terminal disclaimer.

(21) Appl. No.: 16/630,412

(22) PCT Filed: Jul. 10, 2018

(86) PCT No.: PCT/CN2018/095204
§ 371 (c)(1),
(2) Date: Jan. 10, 2020

(87) PCT Pub. No.: WO2019/011255
PCT Pub. Date: Jan. 17, 2019

(65) Prior Publication Data
US 2020/0143068 A1  May 7, 2020

(30) Foreign Application Priority Data

Jul. 11, 2017  (CN) .................. 201710562793.X

(51) Int. Cl.
G06F 21/62   (2013.01)
H04L 9/40    (2022.01)
G06Q 10/105  (2023.01)

(52) U.S. Cl.
CPC ......... *G06F 21/629* (2013.01); *G06Q 10/105* (2013.01); *H04L 63/105* (2013.01); *G06F 2221/2141* (2013.01)

(58) Field of Classification Search
CPC ..... G06F 21/629; G06F 21/62; G06Q 10/105; H04L 63/105
See application file for complete search history.

(56) References Cited

U.S. PATENT DOCUMENTS 6,073,109 A * 6/2000 Flores .............. G06Q 10/06311
709/219
8,527,539 B2 * 9/2013 Traub .................. G06F 21/6218
707/781
(Continued)

FOREIGN PATENT DOCUMENTS

CA   2352948 A1 * 9/2000
CN   101075254 A * 11/2007
(Continued)

OTHER PUBLICATIONS

International Search Report in the international application No. PCT/CN2018/095204, dated Sep. 25, 2018.
(Continued)

Primary Examiner — Gary S Gracia
(74) Attorney, Agent, or Firm — Ladas & Parry, LLP

(57) ABSTRACT

A method for authorizing a field value of a form field by means of a third-party field is provided. The method includes selecting one or more grantees; selecting a form to be authorized, and displaying fields which need control authorization of the permission to view field values by means of third-party fields; selecting one or more third-party fields for each field respectively, where the third-party field includes one or more options; and authorizing a viewing permission of a field value of an authorized field of form
(Continued)

data corresponding to each option of each third-party field respectively.

8 Claims, 9 Drawing Sheets

(56) References Cited

U.S. PATENT DOCUMENTS

| | | | | |
|---|---|---|---|---|
| 9,032,545 | B1* | 5/2015 | Ho | G06F 21/60 |
| | | | | 726/28 |
| 9,141,442 | B1* | 9/2015 | Voelcker | G06F 9/541 |
| 9,461,972 | B1* | 10/2016 | Mehta | H04L 63/0435 |
| 10,681,095 | B1* | 6/2020 | Wang | H04L 67/1097 |
| 11,381,563 | B1* | 7/2022 | Gafa | H04L 63/102 |
| 2005/0210263 | A1* | 9/2005 | Levas | H04L 9/3263 |
| | | | | 713/182 |
| 2006/0218394 | A1* | 9/2006 | Yang | G06F 21/604 |
| | | | | 713/165 |
| 2007/0250905 | A1* | 10/2007 | Clark | G06F 21/6218 |
| | | | | 726/1 |
| 2009/0019516 | A1 | 1/2009 | Hammoutene et al. | |
| 2012/0179503 | A1* | 7/2012 | Chalana | G06Q 10/063112 |
| | | | | 705/7.14 |
| 2012/0317621 | A1 | 12/2012 | Makato | |
| 2013/0246995 | A1* | 9/2013 | Ferrao | G06F 21/54 |
| | | | | 717/104 |
| 2014/0025425 | A1* | 1/2014 | Chalana | G06Q 10/0633 |
| | | | | 705/7.27 |
| 2014/0040153 | A1* | 2/2014 | Singh | G06Q 30/02 |
| | | | | 705/320 |
| 2014/0123057 | A1* | 5/2014 | Eigner | G06F 16/285 |
| | | | | 715/780 |
| 2015/0081629 | A1* | 3/2015 | Newman | H04L 67/1095 |
| | | | | 707/613 |
| 2016/0057147 | A1* | 2/2016 | Mureinik | G06F 9/45558 |
| | | | | 726/4 |
| 2016/0217488 | A1* | 7/2016 | Ward | G06Q 30/0256 |
| 2016/0371062 | A1* | 12/2016 | Wood | G06F 8/315 |
| 2017/0126681 | A1* | 5/2017 | Barrett | H04L 9/3226 |
| 2018/0246705 | A1* | 8/2018 | Spiegel | G06F 9/451 |
| 2019/0050587 | A1* | 2/2019 | Dang | G06F 21/6209 |
| 2020/0034842 | A1* | 1/2020 | Ponniah | G06Q 40/03 |
| 2020/0143068 | A1* | 5/2020 | Chen | G06F 21/6218 |
| 2020/0143077 | A1* | 5/2020 | Chen | G06Q 10/105 |
| 2020/0143328 | A1* | 5/2020 | Chen | G06F 21/629 |
| 2020/0145424 | A1* | 5/2020 | Chen | G06Q 10/063114 |
| 2020/0184091 | A1* | 6/2020 | Chen | G06F 21/62 |
| 2020/0202023 | A1* | 6/2020 | Chen | G06Q 10/10 |
| 2020/0202024 | A1* | 6/2020 | Chen | G06Q 10/109 |
| 2020/0204559 | A1* | 6/2020 | Chen | H04L 63/102 |
| 2020/0218796 | A1* | 7/2020 | Chen | G06F 21/6227 |
| 2020/0218818 | A1* | 7/2020 | Chen | G06F 21/6218 |
| 2020/0218820 | A1* | 7/2020 | Chen | G06Q 10/10 |
| 2020/0219063 | A1* | 7/2020 | Chen | G06F 21/604 |
| 2020/0267111 | A1* | 8/2020 | Chen | H04M 1/27457 |
| 2020/0364355 | A1* | 11/2020 | Chen | G06F 21/6209 |
| 2020/0364364 | A1* | 11/2020 | Chen | G06F 21/6227 |
| 2021/0112071 | A1* | 4/2021 | Chen | H04L 51/42 |
| 2021/0182870 | A1* | 6/2021 | Degeneffe | G06Q 10/1091 |

FOREIGN PATENT DOCUMENTS

| | | |
|---|---|---|
| CN | 101226573 A | 7/2008 |
| CN | 101699478 | 4/2010 |
| CN | 102236659 A | 11/2011 |
| CN | 104408339 A | 3/2015 |
| CN | 104463005 | 3/2015 |
| CN | 104660599 | 5/2015 |
| CN | 104881506 A | 9/2015 |
| CN | 105303084 | 2/2016 |
| CN | 105653977 | 6/2016 |
| CN | 106570406 A | 4/2017 |
| CN | 107358093 A | 11/2017 |

OTHER PUBLICATIONS

Written Opinion of the International Searching Authority in the international application No. PCT/CN2018/095204, dated Sep. 25, 2018 with English translation provided by Google Translate.
PCT International Preliminary Report on Patentability Chapter I from PCT/CN2018/095204 dated Jan. 14, 2022, and its English translation from WIPO.
Office action from Chinese Patent Application No. 201810753143.8 dated Jun. 2, 2020 with search report, and its English translation from Global Dossier.
Office action from Chinese Patent Application No. 201810753143.8 dated Jan. 11, 2021, and its English translation from Global Dossier.
Final rejection from Chinese Patent Application No. 201810753143.8 dated Apr. 19, 2021, with English translation using Microsoft Word.
Reexamination Decision from Chinese Patent Application No. 201810753143.8 dated Sep. 9, 2021, with English translation using Microsoft Word.
Notice of allowance from Chinese Patent Application No. 201810753143.8 dated Sep. 28, 2021, and its English translation from Global Dossier.

* cited by examiner

| Grantee | Form | Last authorization operator: Zhang Er; Operation time: 2017-5-6, 15:00 | | |
|---|---|---|---|---|
| General manager office<br>✓ Clerk 1<br>Clerk 2<br>Clerk 3<br>...... | ✓ Customer contract<br>...... | Authorized field | View | Modify |
| | | Customer name | Contract signing time | Contract signing time; contract signer |
| | | Item quantity | | Contract level |
| | | Item unit price | Industry to which the customer belongs | |
| | | ...... | ...... | ...... |

| Contract signing time | View |
|---|---|
| Time range from a time point, which is determined by going backwards from a current time for a fixed time length, to the current time | |
| Time range from a start time to a current time | January 1, 2016 to now |
| Time range where a time field value is null | ✓ |
| Time range from a system initial time to a current time | |
| ... | ... |

FIG. 7

| Industry to which the customer belongs | View |
|---|---|
| Unrestricted | |
| Null | ✓ |
| Electric appliance | ✓ |
| Machinery | |
| ... | ... |

FIG. 8

| Customer name: Company A | | Customer address: Chengdu | |
|---|---|---|---|
| Contract signing time : June 21, 2017 | | Contact person: ****** | |
| Contact information: ****** | | | |
| Detail list | | | |

| Product model | Quantity | Unit price | |
|---|---|---|---|
| Product A | 100 | 60 | |
| Product B | 90 | 90 | |
| | | | |

FIG. 9

| Grantee | Form | Last authorization operator: Zhang Er; Operation time: 2017-5-6, 15:00 | | |
|---|---|---|---|---|
| | | Authorization template: Created template 1 | | |
| General manager office<br>✓ Clerk 1<br>Clerk 2<br>Clerk 3<br>...... | ✓ Customer contract<br>...... | Authorized field | View | Modify |
| | | Customer name | Contract signing time | Contract signing time; contract signer |
| Template<br>Created template 1<br>Created template 2<br>Created template 3<br>...... | | Item quantity | | Contract level |
| | | Item unit price | Industry to which the customer belongs | |
| | | ...... | ...... | ...... |

FIG. 11

METHOD FOR AUTHORIZING FIELD VALUE OF FORM FIELD BY MEANS OF THIRD PARTY FIELD

CROSS-REFERENCE TO RELATED APPLICATIONS

This application is the U.S. national phase of PCT/CN2018/095204 filed on Jul. 10, 2018, which claims priority to Chinese Application No. 201710562793.X filed on Jul. 11, 2017, the disclosures of which are incorporated by reference herein in their entireties.

BACKGROUND

Technical Field

The present invention relates to a form-authorizing method in a management software system such as ERP, and in particular, to a method for authorizing a field value of a form field by means of a third-party field.

Related Art

A conventional management software system such as ERP provides respective authorization to view and modify the permissions of a form based on form field values. For example, for a contract form, the fields in the form include a contract-signing time, a contract signer, a customer name, a customer industry, and the like. The content of fields viewable for a user can be authorized respectively, to allow a user A to view the contract-signing time and the contract signer in the form and not allow the user A to view the customer name and the customer industry, thus keeping the company's information secret and prevent leakage of confidential information. However, such ERP management software can only authorize each user respectively but cannot achieve authorizing users in batch. The authorization operation has low efficiency, and for a system with a large number of users, it brings tremendous workloads. In addition, the fields in the form cannot be further restricted by the existing software. As a result, after obtaining the permission to view the field value of a certain field, the user can view a large amount of data, which easily causes leakage of information for companies with detailed job responsibilities. For example, a user C is authorized to view the contract-signing time, the contract signer and the customer name of the contract form, but the actual job responsibility of the user C is only in charge of statistics on contract information of a financial industry. However, the existing permission setting method causes the user C to be able to view the contract information of other industries except the financial industry, which is adverse to the information security of the company.

The conventional authorization of form field values cannot control the field value of an authorized field in the form based on a third-party field. For example, when an order form is authorized, it is required to realize, merely by means of field authorization, that Zhang San can only view the price of a unit-price field in a software-industry form but cannot modify the price of the unit-price field, or that Zhang San can only view the prices of unit-price fields in the orders of software industry and chemical industry and can only modify the price of the unit-price field in the orders of chemical industry. The conventional software cannot finely achieve differential authorization for field values of fields, and cannot fit management demand with high requirements.

In addition, role-based access control (RBAC) is one of the most researched and mature permission management mechanisms for databases in recent years. It is considered to be an ideal candidate to replace conventional mandatory access control (MAC) and discretionary access control (DAC). The basic idea of role-based access control (RBAC) is to divide different roles according to different functional positions in the enterprise organization view, encapsulate the access permission of database resources in roles, and allow users to indirectly access database resources by assigning different roles to the users.

A large number of tables and views are often built in large-scale application systems, which makes the management and permissions of database resources very complicated. It is very difficult for a user to directly manage the access and permissions of the database resources. It requires the user to have a very thorough understanding of the database structure and to be familiar with the use of the SQL language. Once the application system structure or security requirements have changed, a large number of complex and cumbersome permission changes are required, and the security vulnerabilities caused by unexpected authorization errors are very likely to occur. Therefore, designing a simple and efficient permission management method for large-scale application systems has become a common requirement for systems and system users.

The role-based permission control mechanism can manage the access permissions of the system simply and efficiently, which greatly reduces the burden and cost of the permission management of the system, and makes the permission management of the system more compliant with the business management specifications of the application system.

However, the conventional role-based user permission management method adopts the "role-to-user one-to-many" relation mechanism, where the "role" has the nature of a group/a class. That is, one role can simultaneously correspond to/be related to multiple users, and the role is similar to a post/a position/a type of work or other concepts. The permission authorized to a user under this relation mechanism is basically divided into the following three forms: 1. As shown in FIG. 1, the permission is directly authorized to the user, where the disadvantage is that the workload is large and the operation is frequent and cumbersome. 2. As shown in FIG. 2, the role (having the nature of a class/a group/a post/a type of work) is authorized (one role may be related to multiple users), and the user obtains permissions through its role. 3. As shown in FIG. 3, the above two methods are combined.

In the above descriptions, as both 2 and 3 need to authorize the role that has the nature of a class/a group. The way of authorization through the role having the nature of a class/a group/a post/a type of work has the following disadvantages: 1. Operations are difficult when the user's permission has changed. In the actual process of using a system, the user's permissions often need to be adjusted during the operation process. For example, in processing the change of an employee's permissions, when the permissions of the employee related to the role have changed, it is improper to change the permissions of the entire role due to the change of the permissions of the individual employee, because this role is also related to other employees whose permissions remain unchanged. To deal with this situation, either a new role is created to fit the employee whose permissions have changed, or permissions are directly authorized to the employee (disengaged from the role) based on permission requirements. The above two processing methods not only take a long time but also cause mistakes easily for the role authorization in the case of a large number of role permissions. It is cumbersome for a user to operate, and errors occur easily, resulting in loss to the system user.

2. It is difficult to remember the specific permissions contained in a role for a long time. If the role has many permission function points, as time goes by, it is difficult to remember the specific permissions of the role, and it is even more difficult to remember the permission differences between roles with similar permissions. If a new user needs to be related, it is impracticable to accurately determine how to select a relation.

3. Because user's permissions change, more roles will be created (if new roles are not created, direct authorization to the user will be increased greatly), and it is more difficult to distinguish specific differences between permissions of the roles.

4. When a user is transferred from a post, if many permissions of the transferred user need to be assigned to other users, it is necessary to distinguish the permissions of the transferred user and create roles to be related to the other users respectively during the processing. Such operations are not only complicated and time-consuming, but also prone to errors.

SUMMARY

Technical Problems

The object of the present invention is to overcome the deficiencies of the prior art, and provide a method for authorizing a field value of a form field by means of a third-party field, so that the field values of the authorized fields of a form are controlled by means of third-party fields, thus finely achieving differential authorization for field values of fields.

Solutions to Problems

Technical Solutions

The object of the present invention is achieved by the following technical solutions: A method for authorizing a field value of a form field by means of a third-party field includes:

(1) selecting one or more grantees;

(2) selecting a form to be authorized, and displaying authorized fields which need to control authorization of the permission to view field values thereof by means of third-party fields in the form;

(3) selecting one or more third-party fields for each authorized field respectively, wherein said third-party field is a field in the selected form, and said third-party field includes one or more options; and (4) authorizing a viewing permission of a field value of an authorized field of form data corresponding to each option of each third-party field respectively.

Steps (2), (3), and (4) are performed sequentially, and step (1) is performed before step (2), or performed between step (2) and step (3), or performed between step (3) and step (4), or performed after step (4).

Preferably, said grantee includes one or more types of a person, a user, a group, a class, and a role, said role is an independent individual not a group/a class, one role can only be related to a unique user during the same period, and one user is related to one or more roles.

Preferably, said role belongs to a certain department, the role is unique under the department, the role is authorized according to the work content of the role, and a user obtains permissions through a related role.

Preferably, during cross-department transfer of the user, the user's relation to the role in the original department is canceled, and the user is related to a role in a new department.

Preferably, said third-party field includes a time property field and a non-time property field, and an option of said time property field is determined by an authorization operator; a field value of said non-time property field is determined by selection or determined automatically, and all candidate options determined by selection or determined automatically are used as options of the non-time property field.

Preferably, the options of said time property field include one or more of the following six types: a time range from a time point, which is determined by going backwards from a current time for a fixed time length, to the current time, a time range from a start time to a current time, a time range from a deadline to a system initial time, a time range from a start time to a deadline, a time range where a time field value is null, and a time range from a system initial time to a current time, and said time range from the system initial time to the current time includes the time range where the time field value is null.

Preferably, when there is one grantee, the viewing permission of the field value of the authorized field of said grantee's form is displayed as the viewing permission that is saved when the field value of the authorized field of the grantee's form is authorized at last time, and when there are two or more grantees, the viewing permission of the field value of said grantees' form is not displayed.

Preferably, for the field value that does not have the viewing permission, display modes include: (1) displaying a field corresponding to the field value, but hiding the field value by using a hiding symbol; and (2) displaying neither the field value nor the field corresponding to the field value.

A method for authorizing a field value of a form field by means of a third-party field includes: selecting one or more grantees; selecting a form to be authorized, and displaying authorized fields which need to control authorization of the permission to view field values thereof by means of third-party fields in the form; selecting a template: selecting an existing grantee or a created template as an authorization template, and updating a viewing permission of a field value of an authorized field of said grantee's form to a viewing permission of a field value of a corresponding field in the authorization template; and determining whether to continue modifying after the template is selected, if yes, determining a third-party field for each (each that needs to be modified) authorized field respectively, where said third-party field is a field in the selected form, and said third-party field includes one or more options; and authorizing/modifying and then saving the viewing permission of the field value of the authorized field of form data corresponding to each option of each (each that needs to be modified) third-party field respectively; otherwise, saving the viewing permission.

The step of "determining a third-party field for each authorized field respectively, where said third-party field is a field in the selected form, and said third-party field includes one or more options" may be set before the step of "selecting a template".

A method for authorizing a field value of a form field by means of a third-party field includes:

(1) selecting one or more grantees;

(2) selecting a form to be authorized, and displaying authorized fields which need to control authorization of the permission to modify field values thereof by means of third-party fields in the form; and (3) selecting one or more third-party fields for each authorized field, where said third-party field is a field in the selected form, and said third-party field includes one or more options; and (4) authorizing a modification permission of a field value of an authorized field of form data corresponding to each option of each third-party field respectively.

Steps (2), (3), and (4) are performed sequentially, and step (1) is performed before step (2), or performed between step (2) and step (3), or performed between step (3) and step (4), or performed after step (4).

BENEFICIAL EFFECTS OF THE INVENTION

Beneficial Effects

The present invention has the following beneficial effects:
(1) In the present invention, the authorized fields in a form that need to authorize the viewing permission/modification permission of the field values are restricted by setting third-party fields, so that the viewing permission/modification permission of a grantee is set to be consistent with its job responsibility, thus preventing the grantee from viewing/modifying the form information (field content information in the form) irrelevant to its work, which reduces possibility of leakage of company information.

(2) When there is one grantee, the viewing permission of the field value of the authorized field of the grantee's form is displayed as the viewing permission that is saved when the field value of the authorized field of the grantee's form is authorized at last time, so that an authorization operator can make modifications on this basis, thus improving form authorization efficiency. Two or more grantees can be authorized at the same time, which improves authorization efficiency for batch grantees with exactly or mostly the same permissions.

(3) The viewing permission of the field value of the authorized field of the grantee's form is updated to the viewing permission of the field value of the corresponding field in the authorization template, which can improve the form authorization efficiency, especially the authorization efficiency of mass forms with exactly or mostly the same permissions.

(4) The conventional permission management mechanism defines the nature of a group, a type of work, a class or the like as the role. The role is in a one-to-many relation to the user. In the actual process of using a system, the user's permissions often need to be adjusted during the operation process. For example, in processing the change of an employee's permissions, when the permissions of the employee related to the role have changed, it is improper to change the permissions of the entire role due to the change in the permissions of the individual employee, because this role is also related to other employees whose permissions remain unchanged. To deal with this situation, either a new role is created to fit the employee whose permissions have changed, or permissions are directly authorized to the employee (disengaged from the role) based on permission requirements. The above two processing methods not only take a long time but also cause mistakes easily for the role authorization in the case of a large number of role permissions. It is cumbersome for a user to operate, and errors occur easily, resulting in loss to the system user.

However, under the method of the present application, as the role is an independent individual, the object can be achieved by changing the permissions of the role. Although the method in the present application seems to increase the workload during system initialization, by means of copying or the like, the role can be created or authorized more efficiently than the conventional roles having the nature of a group. As it is unnecessary to consider the commonality of the roles having the nature of a group when satisfying the related users, the solutions in the present application make the permission setting clear and explicit. Especially after the system has been used for a period of time (after the permissions of the user/role have changed dynamically), the solutions in the present application can significantly improve the permission management efficiency for the system user in using the system, make the dynamic authorization simpler, more convenient, clearer and more explicit, and improve the efficiency and reliability of the permission setting.

(5) The conventional role authorization method with the nature of a group is prone to errors. The method provided in the present application significantly reduces the probability of authorization errors, because the method of the present application only needs to consider the role as an independent individual, without considering the commonality of multiple users related to the role having the nature of a group under the conventional method. Even if the authorization errors occur, only the user related to the role is affected. However, in the case of the conventional role having the nature of a group, all users related to the role are affected. Even if the authorization errors occur, the correction method in the present application is simple and takes a short time, while in the case of the conventional role having the nature of a group, the commonality of the permissions of all users related to the role needs to be considered during the error correction. The modification is cumbersome, complex, and error-prone when there are many function points, and in many cases, the problem cannot be solved unless a new role is created.

(6) In the conventional group-based role authorization method, if the role has many permission function points, as time goes by, it is difficult to remember the specific permissions of the role, and it is even more difficult to remember the permission differences between roles with similar permissions. If a new user needs to be related, it cannot be accurately determined how to select a relation. In the method of the present application, the role itself has the nature of a post number/a station number, such that the selection can be made easily.

(7) When a user is transferred from a post, if many permissions of the transferred user need to be assigned to other users, in processing, it is necessary to distinguish the permissions of the transferred user and create roles to be related to other users respectively. The operations are complicated, time-consuming, and prone to errors.

The method in the present application is as follows: The transferred user is related to several roles. When the user is transferred, the relation between the user and the roles in the original department is first canceled (the canceled roles may be re-related to other users), and then the user is related to a role in a new department. The operation is simple and not error-prone.

(8) The role belongs to a department, and then the department to which the role belongs cannot be replaced. Reasons why the department to which the role belongs cannot be replaced are as follows. Reason 1: As the role in the present application is equivalent to a station number/a post number in nature, different station numbers/post numbers have different work content or permissions. For example, the role of a salesperson 1 under a sales department and the role of a developer 1 under a technical department are two completely different station numbers or post numbers, and have different permissions. Reason 2: If the department (sales department) to which the role of the salesperson 1 belongs is replaced by the technical department without changing the permissions of the role of the salesperson 1, the role that owns the permissions of the sales department exists in the technical department. This leads to management confusion and security vulnerabilities.

BRIEF DESCRIPTION OF THE DRAWINGS

Description of the Drawings

Figure 1:
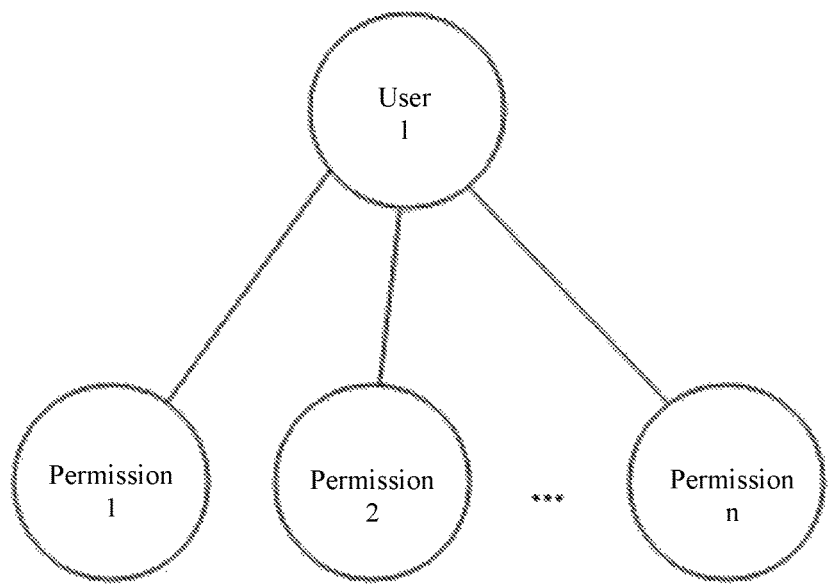
Figure 2:
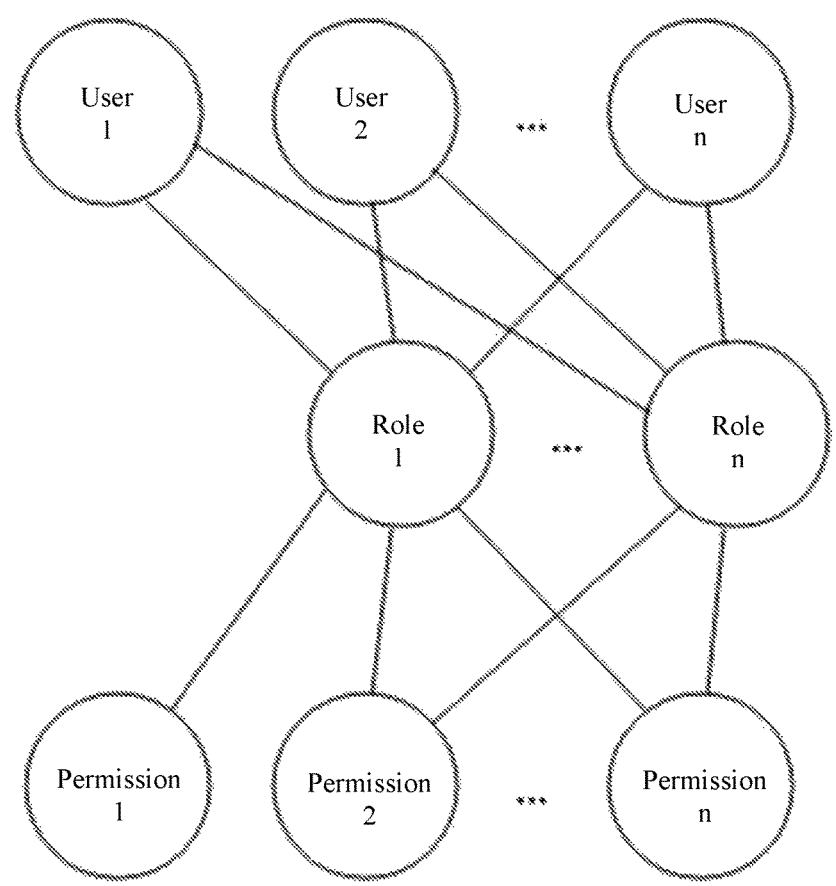
Figure 3:
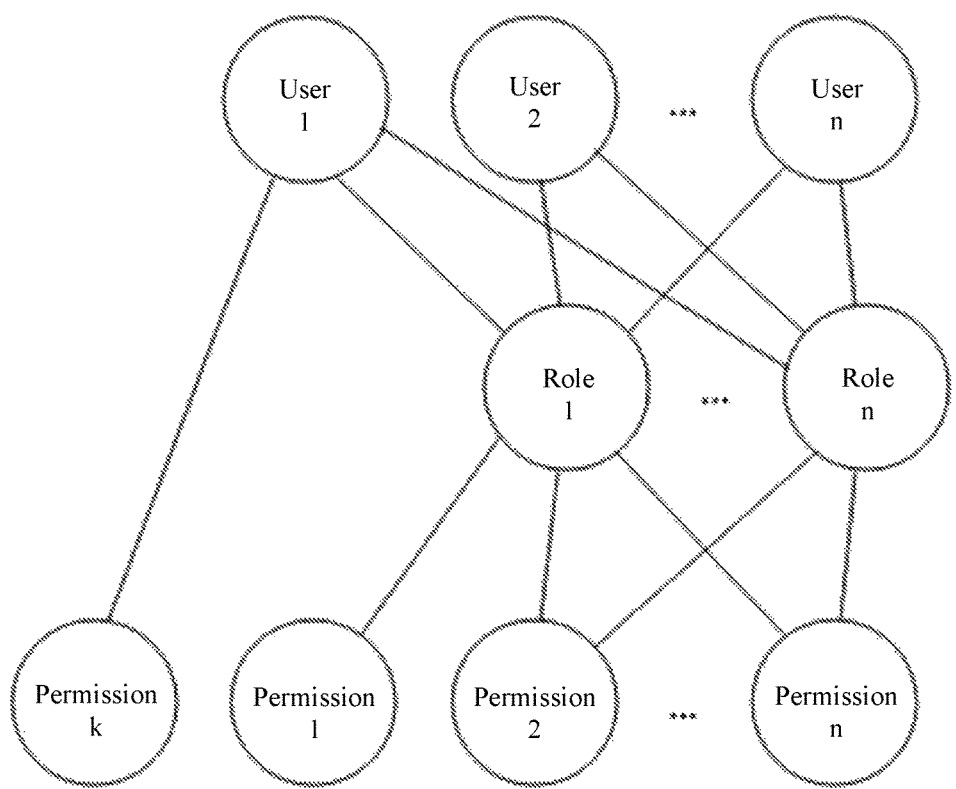
Figure 4:
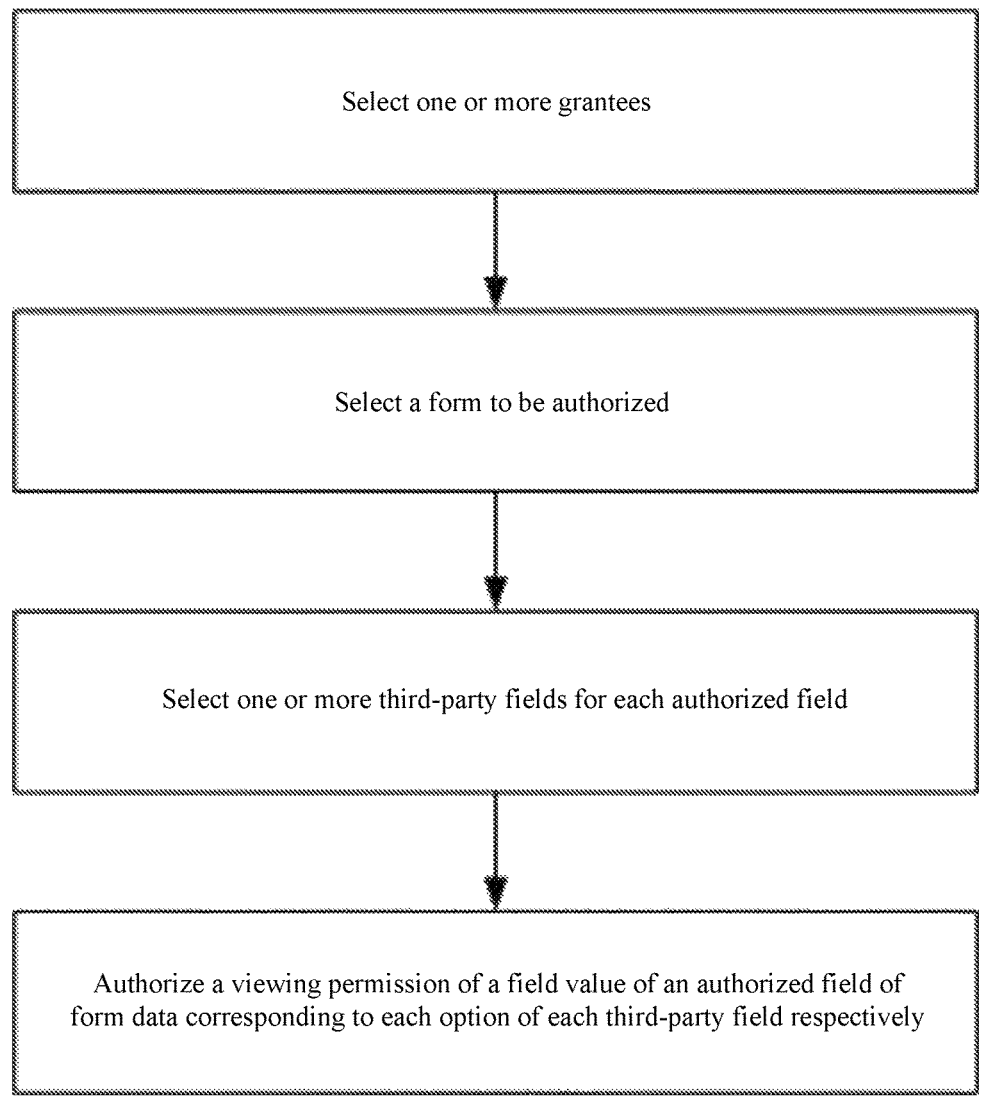
Figures 5, 6:
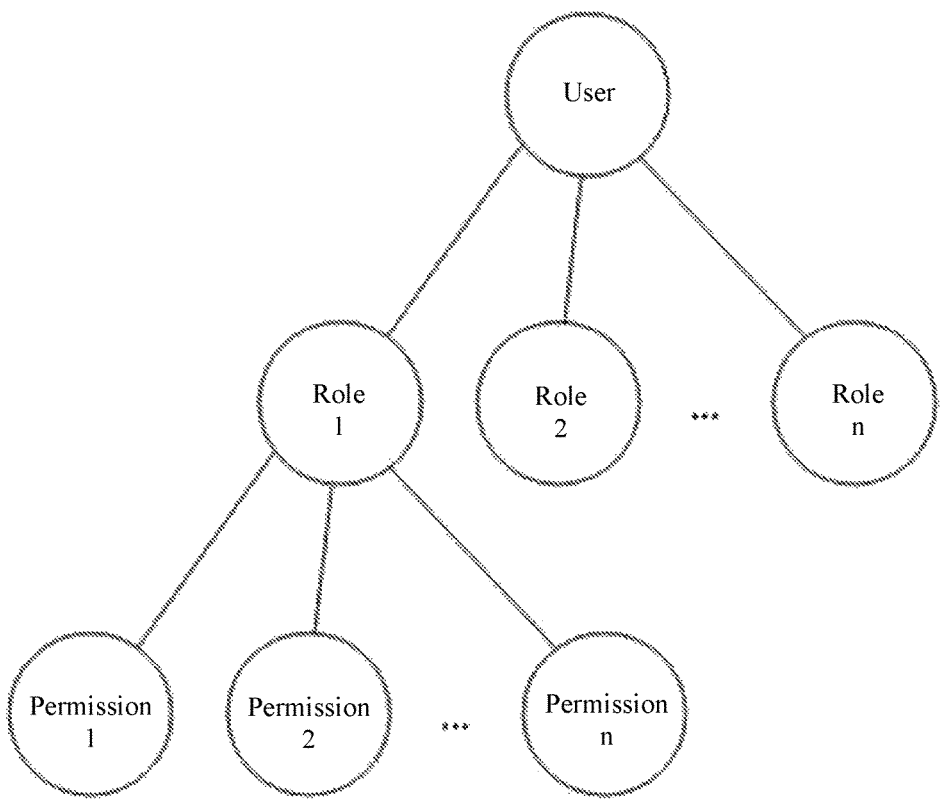
Figure 10:
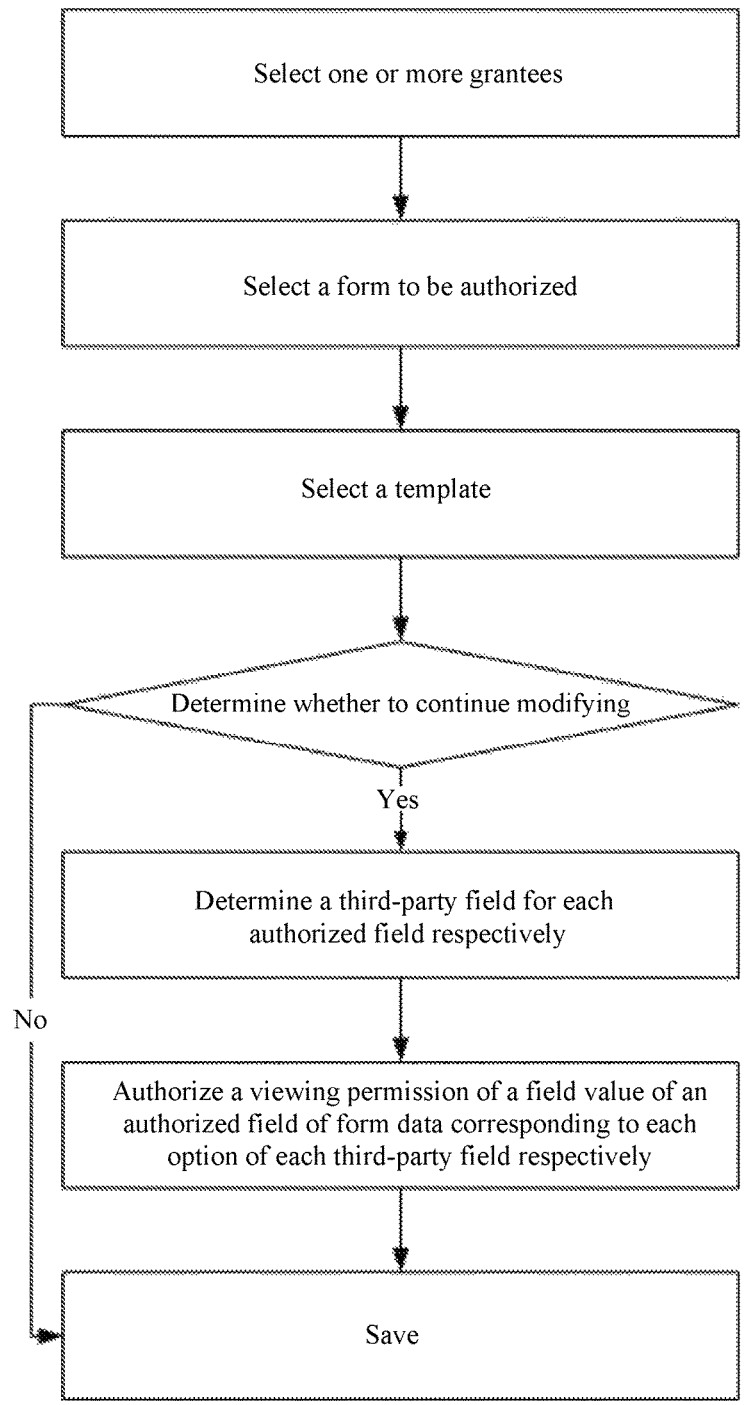
Figure 12:
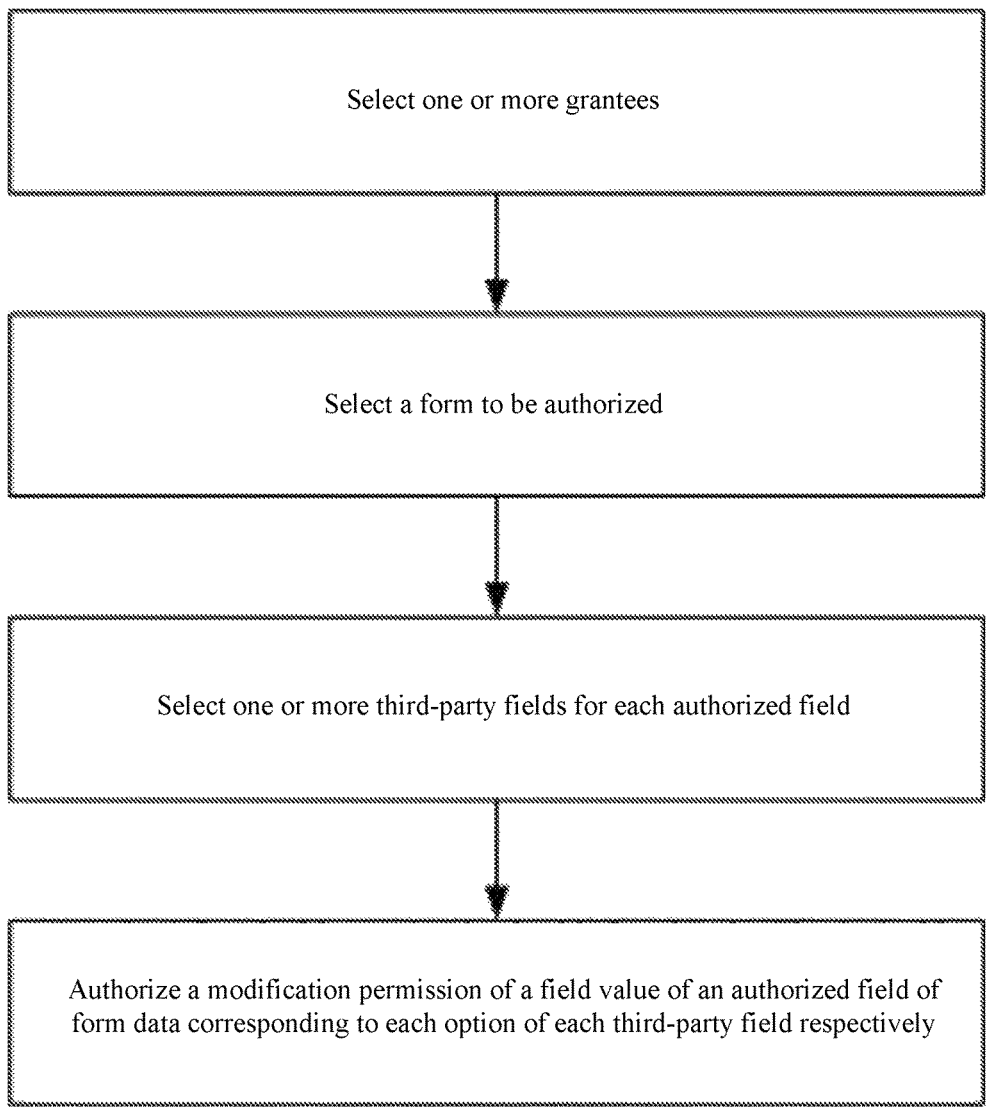

FIG. 1 is a schematic diagram in which a system directly authorizes a user in the prior art;

FIG. 2 is a schematic diagram in which a system authorizes a role having the nature of a group/a class in the prior art;

FIG. 3 is a schematic diagram in which a system both directly authorizes a user and a role having the nature of a group/a class in the prior art;

FIG. 4 is a flowchart of an embodiment in the present invention;

FIG. 5 is a schematic diagram in which a system authorizes a user through a role having the nature of an independent individual according to the present invention;

FIG. 6 is a schematic diagram of a form in the present invention;

FIG. 7 is a schematic diagram after a contract-signing time is selected in FIG. 6;

FIG. 8 is a schematic diagram after an industry to which a customer belongs is selected in FIG. 6;

FIG. 9 is a schematic diagram of a contract form;

FIG. 10 is a flowchart of another embodiment in the present invention;

FIG. 11 is a schematic diagram of a form after an authorization template is selected; and FIG. 12 is a flowchart of still another embodiment in the present invention.

DETAILED DESCRIPTION

Description of Embodiments

The technical solutions of the present invention will be further described in detail below with reference to the figures, but the protection scope of the present invention is not limited to the following descriptions.

Embodiment 1

As shown in FIG. 4, a method for authorizing a field value of a form field by means of a third-party field includes: selecting one or more grantees. The grantee includes one or more of a person, a user, a group, a class, and a role, the role is an independent individual not a group/class, one role can only be related to a unique user during the same period, and one user is related to one or more roles.

As shown in FIG. 5, the role belongs to a certain department, and the role is authorized according to the work content of the role; the name of the role is unique under the department, and the number of the role is unique in a system. The user determines (obtains) permissions through its relation to the role, one employee corresponds to one user, and one user corresponds to one employee.

Definition of a role: A role does not have the nature of a group/a class/a category/a post/a position/a type of work or the like, but has a non-collective nature. The role is unique and is an independent individual. Applied in an enterprise or an institution, the role is equivalent to a post number (the post number herein is not a post, and one post may have multiple employees at the same time, but one post number can only correspond to one employee during the same period).

For example, in a company system, the following roles may be created: a general manager, a deputy general manager 1, a deputy general manager 2, a manager of Beijing sales department I, a manager of Beijing sales department II, a manager of Beijing sales department III, a Shanghai sales engineer 1, a Shanghai sales engineer 2, a Shanghai sales engineer 3, a Shanghai sales engineer 4, a Shanghai sales engineer 5, and so on. The relation between users and roles is as follows: if Zhang San, the company's employee, serves as a deputy general manager 2 of the company and also serves as a manager of Beijing sales department I, the roles to which Zhang San needs to be related are the deputy general manager 2 and the manager of Beijing sales department I, and Zhang San owns the permissions of the two roles.

The concept of conventional roles is a group/a class/a post/a position/a type of work in nature, and one role can correspond to multiple users. However, in the present application, the concept of "role" is equivalent to a post number/a station number, and is also similar to the role in a film and television drama: one role (in childhood, juvenile, middle-age . . . ) can be played by only one actor or actress during the same period, but one actor or actress may play multiple roles.

During cross-department transfer of the user, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

The form to be authorized is selected, and authorized fields which need to control authorization of the permission to view field values thereof by means of third-party fields in the form are displayed, and "thereof" herein refers to the authorized fields. As shown in FIG. 6, a contract form includes a customer name, an item quantity, and an item unit price.

When there is one grantee, the viewing permission of the field value of the authorized field of the grantee's form is displayed as the viewing permission that is saved when the field value of the authorized field of the grantee's form is authorized at last time; when there are two or more grantees, the viewing permission of the field value of the authorized field of the grantees' form is not displayed.

When there is one grantee, after the grantee and the form are selected, the authorization operator and the authorization time that the viewing permission of the field value of the authorized field of the grantee's form is authorized at last time are displayed, which helps to track accountability when an error occurs in the grantee's permissions and helps to determine whether the field value of the authorized field of the grantee's form needs to be authorized. As shown in FIG. 6, an authorization operator who authorizes the viewing permission of the field value of the authorized field of the clerk 1's contract form at last time is Zhang Er, and an authorization time is 15:00 on May 6, 2017. For example, an operator needs to authorize 100 roles; however, the operator only finished authorizing 70 roles on that day. When the operator continued to authorize the role on the next day, a role to be authorized can be found by screening the authorization operators or the time of the last authorization of the viewing permission of the field value of the authorized field in the form. For another example, by viewing the last time when the viewing permission of the field value of the authorized field in the form is authorized to a role, it can be known how long the viewing permission of the field value of the authorized field in the form have remained unchanged, which helps to determine whether the viewing permission of the field value of the authorized field in the form needs to be re-authorized.

One or more third-party fields are selected for each authorized field. The third-party field is the field in the selected form, and the third-party field includes one or more options. As shown in FIG. 6, in the viewing permissions, the third-party field selected for the authorized field "customer name" is "contract-signing time"; the third-party field selected for the authorized field "item unit price" is "industry to which the customer belongs".

The third-party field includes a time property field and a non-time property field, and the option of the time property field is determined by an authorization operator; the field value of the non-time property field is determined by selection (for example, the field value of an industry field to which a customer form belongs includes options such as a manufacturing industry, a financial industry, an aircraft industry, and the like, and such fields include a customer level, a department, and the like, which are not filled manually) or determined automatically (for example, for fields such as a form creator, a form recorder, a form making role, a form making person, and the like, their field values are automatically determined/saved according to a related rule once the form fields are determined/saved; for example, the candidate options of the creator (field) are all persons in the system, but the creator is the current person automatically obtained according to a rule when the form is created), and all candidate options (all candidate options of the field value of the field) determined by selection or determined automatically are used as the options of the non-time property field (the non-time property field).

The options of the time property field include one or more of the following six types: a time range from a time point, which is determined by going backwards from a current time for a fixed time length, to the current time, a time range from a start time to a current time, a time range from a deadline to a system initial time, a time range from a start time to a deadline, a time range where a time field value is null, and a time range from a system initial time to a current time, and the time range from the system initial time to the current time includes the time range where the time field value is null. Among those, the time range from a time point, which is determined by going backwards from a current time for a fixed time length, to the current time, the time range from a start time to a current time, the time range from a deadline to a system initial time, and the time range from a start time to a deadline are filled and determined by the authorization operator. The time range where a time field value is null, and the time range from a system initial time to a current time are selected and determined by the authorization operator. As shown in FIG. 7, in the four options of contract-signing time displayed after the third-party field is selected as "contract-signing time", the time range from a start time to a current time is filled by the authorization operator, that is, "Jan. 1, 2016 to now", and the time range where a time field value is null is selected by the authorization operator.

The above six types of time ranges are described below by examples: the time range from a time point, which is determined by going backwards from a current time for a fixed time length, to the current time. For example, on Jun. 20, 2017, an employee A is authorized to view the customer names of contract forms (contracts) signed (having a contract-signing time) within a time range from a time point, which is determined by going backwards 6 days from Jun. 20, 2017, to Jun. 20, 2017. That is, on Jun. 20, 2017, the employee A can view the customer names (the customer names refer to the content in the customer name field, and the same below) of contract forms (contracts) signed (having a contract-signing time) from Jun. 15, 2017 to Jun. 20, 2017; on Jun. 21, 2017, the employee A can view the customer names of contract forms (contracts) signed (having a contract-signing time) from Jun. 16, 2017 to Jun. 21, 2017; on Jun. 22, 2017, the employee A can view the customer names of contract forms (contracts) signed (having a contract-signing time) from Jun. 17, 2017 to Jun. 22, 2017, and so on. That is, the time length of the time range is fixed, and the start time and the deadline are both variable.

The time range from a start time to a current time (the current time is dynamic). For example, on May 1, 2015, the employee A is authorized to view the customer names of contract forms (contracts) signed (having a contract-signing time) from Feb. 1, 2015 to the current date (current time). Then, the employee A can view the customer names of all contract forms (contracts) signed (having a contract-signing time) from Feb. 1, 2015 to May 1, 2015; on May 2, 2015, the employee A can view the customer names of all contract forms (contracts) signed (having a contract-signing time) from Feb. 1, 2015 to May 2, 2015 (further, the start time can be defined as excluding the start time, and when the start time is excluded, the employee A cannot view the customer names of contracts signed on Feb. 1, 2015, and can only view the customer names of all contracts signed after Feb. 1, 2015).

The time range from a deadline to a system initial time. For example, the employee A is authorized to view the customer names of contract forms (contracts) signed (having a contract-signing time) from Feb. 1, 2015 to the system initial time. Then, the employee A can view the customer names of all contract forms (contracts) signed (having a contract-signing time) from Feb. 1, 2015 to the system initial time (that is, the employee A can view the customer names of all contracts in the system signed on and before Feb. 1, 2015); (further, the deadline can be defined as excluding the deadline, and when the deadline is excluded, the employee A cannot view the customer names of contracts signed on Feb. 1, 2015, and can only view the customer names of contracts signed before Feb. 1, 2015; furthermore, the system initial time may not be set and only the deadline is set, and in this case, the employee A can view the customer names of all contracts signed on and before the deadline, or the employee A can view the customer names of all contracts signed before the deadline).

The time range from a start time to a deadline. For example, the employee A is authorized to view the customer names of contract forms (contracts) signed (having a contract-signing time) from Feb. 1, 2015 to Jun. 1, 2015. Then, the employee A can view the customer names of all contract forms (contracts) signed (having a contract-signing time) from Feb. 1, 2015 to Jun. 1, 2015.

The time range where a time field value is null. For example, a delivery time in a contract is not a mandatory field, and in some contract forms (contracts), the delivery time is not filled. The employee A is authorized to view the customer names of contract forms in which the time field value of the delivery time is null. Then, the employee A can view the customer names of all contract forms (contracts) in which the delivery time is not filled.

The time range from a system initial time to a current time (the current time is dynamic). For example, on Jun. 1, 2017, the employee A is authorized to view the customer names of contract forms signed (having a contract-signing time) from the system initial time to the current time. Then, on Jun. 1, 2017, the employee A can view the customer names of all contract forms (contracts) signed (having a contract-signing time) from the system initial time to Jun. 1, 2017; on Jun. 2, 2017, the employee A can view all customer names of contract forms (contracts) signed (having a contract-signing time) from the system initial time to Jun. 2, 2017, and so on. The time range from the system initial time to the current time includes the time range where the time field value is null (further, the specific time values of the system initial time and the current time may not be set; as long as "the time range from a system initial time to the current time" is set for the employee A, the employee A can view the customer names of all contracts in the system signed at any time, including null time).

The viewing permission of the field value of the authorized field of form data corresponding to each option of each third-party field is authorized respectively. As shown in FIG. 8, "null" and "electric appliance" are selected in the form data corresponding to the industry to which the customer belongs displayed after the third-party field is selected as "industry to which the customer belongs", where "null" herein refers to that the industry is null. That is, the clerk 1 can view the prices of item unit prices in the contracts of the electric appliance industry (the customer belongs to the electric appliance industry) and the industry with null value (the industry to which the customer belongs is null, or the field of the industry to which the customer belongs has no field value/content). Assuming that "unrestricted" is selected in FIG. 8, the clerk 1 can view the prices of item unit prices in the contracts of all industries such as the electric appliance industry and the machinery industry (including subsequently added industries) and the contracts in which field values of the industry to which the customer belongs are "null".

For the field value that does not have the viewing permission, the display modes include: (1) displaying the field corresponding to the field value, but hiding the field value by using a hiding symbol; and (2) displaying neither the field value nor the field corresponding to the field value. As shown in FIG. 9, when the user views the contract form, because the user does not have the permissions of the customer contact information and contact person, the customer contact information and the contact person are displayed with the symbol * when the user views the contract form.

Embodiment 2

As shown in FIG. 10, a method for authorizing a field value of a form field by means of a third-party field includes: selecting one or more grantees. The grantee includes one or more of a person, a user, a group, a class, and a role, the role is an independent individual not a group/a class, one role can only be related to a unique user during the same period, and one user is related to one or more roles. The role belongs to a certain department, the role is unique under the department, the role is authorized according to the work content of the role, and the user obtains permissions through a related role. During cross-department transfer of the user, the user's relation to the role in the original department is canceled, and the user is related to a role in a new department.

A form to be authorized is selected, and authorized fields which need to control authorization of the permission to view field values thereof by means of third-party fields in the form are displayed, where "thereof" herein refers to the authorized fields.

When there is one grantee, the viewing permission of the field value of the authorized field of the grantee's form is displayed as the viewing permission that is saved when the field value of the authorized field of the grantee's form is authorized at last time, and when there are two or more grantees, the viewing permission of the field value of the authorized field of the grantees' form is not displayed.

When there is one grantee, after the grantee and the form are selected, the authorization operator and the authorization time that the viewing permission of the field value of the authorized field of the grantee's form is authorized at last time are displayed, which helps to track accountability when an error occurs in the grantee's permissions and helps to determine whether the field value of the authorized field of the grantee's form needs to be authorized.

The template is selected: selecting the existing grantee or the created template as an authorization template, and updating the viewing permission of the field value of the authorized field of the grantee's form to the viewing permission of the field value of the corresponding field in the authorization template. As shown in FIG. 11, a created template 1 is selected as the authorization template.

It is determined whether to continue modifying after the template is selected: if yes, determining (the determining herein represents adding, reducing, or neither adding nor reducing) a third-party field for each authorized field respectively, where the third-party field is the field in the selected form, and the third-party field includes one or more options; and authorizing and saving the viewing permission of the field value of the authorized field of form data corresponding to each option of each third-party field respectively; otherwise, saving the viewing permission.

The third-party field includes the time property field and the non-time property field, and the option of the time property field is determined by an authorization operator; the field value of the non-time property field is determined by selection (for example, the field value of an industry field to which a customer form belongs is selected from a manufacturing industry, a financial industry, an aircraft industry, and the like, and such fields include a customer level, a department, and the like, which are not filled manually) or determined automatically (for example, for fields such as a form creator, a form recorder, a form making role, a form making person, and the like, their field values are automatically determined/saved according to a related rule once the form fields are determined/saved; for example, the candidate options of the creator (field) are all persons in the system, but the creator is the current person automatically obtained according to a rule when the form is created), and all candidate options (all candidate options of the field value of the field) determined by selection or determined automatically are used as the options of the non-time property field (the non-time property field).

The options of the time property field include one or more of the following six types: a time range from a time point, which is determined by going backwards from a current time for a fixed time length, to the current time, a time range from a start time to a current time, a time range from a deadline to a system initial time, a time range from a start time to a deadline, a time range where a time field value is null, and a time range from a system initial time to a current time, and the time range from the system initial time to the current time includes the time range where the time field value is null.

The display modes of the field value that does not have the viewing permission comprise: (1) displaying a field corresponding to the field value, but hiding the field value by using a hiding symbol; and (2) displaying neither the field value nor the field corresponding to the field value.

Embodiment 3

As shown in FIG. 12, a method for authorizing a field value of a form field by means of a third-party field includes: selecting one or more grantees. The grantee includes one or more types of a person, a user, a group, a class, and a role, the role is an independent individual not a group/a class, one role can only be related to a unique user during the same period, and one user is related to one or more roles. The role belongs to a certain department, the role is unique under the department, the role is authorized according to the work content of the role, and the user obtains permissions through a related role. During cross-department transfer of the user, the user's relation to the role in the original department is canceled, and the user is related to a role in a new department.

The form to be authorized is selected, and authorized fields which need to control authorization of the permission to modify field values thereof by means of third-party fields in the form are displayed, where "thereof" herein refers to the authorized fields.

When there is one grantee, the viewing permission of the field value of the authorized field of the grantee's form is displayed as the viewing permission that is saved when the field value of the authorized field of the grantee's form is authorized at last time, and when there are two or more grantees, the viewing permission of the field value of the authorized field of the grantees' form is not displayed.

When there is one grantee, after the grantee and the form are selected, the authorization operator and the authorization time that the viewing permission of the field value of the authorized field of the grantee's form is authorized at last time are displayed, which helps to track accountability when an error occurs in the grantee's permissions and helps to determine whether the field value of the authorized field of the grantee's form needs to be authorized.

One or more third-party fields are selected for each authorized field, where the third-party field is the field in the selected form, and the third-party field includes one or more options. As shown in FIG. 6, in the viewing permissions, the third-party fields selected for the authorized field "customer name" are "contract-signing time, contract signer"; the third-party field selected for the authorized field "item quantity" is "contract level".

The third-party field includes the time property field and the non-time property field, and the option of the time property field is determined by an authorization operator; the field value of the non-time property field is determined by selection (for example, the field value of an industry field to which a customer form belongs is selected from a manufacturing industry, a financial industry, an aircraft industry, and the like, and such fields include a customer level, a department, and the like, which are not filled manually) or determined automatically (for example, for fields such as a form creator, a form recorder, a form making role, a form making person, and the like, their field values are automatically determined/saved according to a related rule once the form fields are determined/saved; for example, the candidate options of the creator (field) are all persons in the system, but the creator is the current person automatically obtained according to a rule when the form is created), and all candidate options (all candidate options of the field value of the field) determined by selection or determined automatically are used as the options of the non-time property field (the non-time property field).

The options of the time property field include one or more of the following six types: a time range from a time point, which is determined by going backwards from a current time for a fixed time length, to the current time, a time range from a start time to a current time, a time range from a deadline to a system initial time, a time range from a start time to a deadline, a time range where a time field value is null, and a time range from a system initial time to a current time, and the time range from the system initial time to the current time includes the time range where the time field value is null.

The modification permission of the field value of the authorized field of form data corresponding to each option of each third-party field are authorized respectively.

The field value that does not have the modification permission is displayed distinguishing from the field and the field value having the modification permission. For example, the field and field value having the modification permission are displayed in black, and field and field value that do not have the modification permission or the field value that does not have the modification permission is displayed in gray.

The above is only a preferred embodiment of the present invention, and it should be understood that the present invention is not limited to the forms disclosed herein, and is not to be construed as being limited to the other embodiments, but may be used in various other combinations, modifications and environments. Modification can be made by the techniques or knowledge of the above teachings or related art within the scope of the teachings herein. All changes and modifications made by those skilled in the art without departing from the spirit and scope of the present invention are intended to be within the protection scope of the appended claims.

What is claimed is:

1. A method for authorizing a field value of a form field by means of a third-party field, comprising:

selecting a grantee, wherein the grantee comprises a role, the role belongs to a certain department, the role is unique under the department, the role is authorized according to the work content of the role;

selecting a form to be authorized, and displaying one or more form fields for control authorization to view a field value of the displayed one or more form fields by means of the third-party field in the form;

selecting the third-party field from the selected form for the displayed one or more form fields, wherein said selected third-party field comprises at least one option; and authorizing a viewing permission of the field value of the displayed one or more form fields of form data to the grantee, wherein the field value of form data is configured to correspond to the at least one option of the selected third-party field, wherein the viewing permission of the field value of the field of form data corresponding to each option of each third-party field is authorized respectively and the field value of the field that does not have the viewing permission is not being displayed to distinguish from the field and the field value having the viewing permission;
wherein one role is independent which is not a group or class, the one role is configured to be related to a user only during a same period, the user is configured to be related to the one role or more roles, and the user is configured to obtain the viewing permission of the related one role or more roles.

2. The method according to claim 1, wherein during cross-department transfer of the user, the user's relation to a role in an original department is canceled, and the user is related to a new role in a new department.

3. The method according to claim 1, wherein said third-party field comprises a time property field and a non-time property field, and the at least one option of said time property field is determined by an authorization operator; a field value of said non-time property field is determined by selection or determined automatically, and all candidate options determined by selection or determined automatically are being used as the at least one option of the non-time property field.

4. The method according to claim 3, wherein the at least one option of said time property field comprises one or more of the following: a time range from a time point, which is determined by going backwards from a current time for a fixed time length, to the current time; a time range from a start time to a current time; a time range from a deadline to a system initial time; a time range from a start time to a deadline; a time range where a time field value is null; and a time range from a system initial time to a current time, and said time range from the system initial time to the current time comprises the time range where the time field value is null.

5. The method according to claim 1, wherein when there is one grantee, displaying the viewing permission of the field value when the field value was authorized last time for the grantee as the viewing permission, and when there are two or more grantees, the viewing permission of the field value is not displayed.

6. The method according to claim 1, wherein for a field value that does not have the viewing permission:
displaying a field corresponding to the field value, and hiding the field value; or
displaying neither the field value nor the field corresponding to the field value.

7. A method for authorizing a field value of a form field by means of a third-party field, comprising:
selecting a grantee, wherein the grantee comprises a role, the role belongs to a certain department, the role is unique under the department, the role is authorized according to the work content of the role;
selecting a form to be authorized, and displaying one or more form fields for control authorization to view a field value of the displayed one or more form fields by means of the third-party field in the form;
selecting an existing grantee or a predetermined template as an authorization template, and using a viewing permission of the field value corresponding to the viewing permission of the field value of a corresponding field in the authorization template; and
determining the third-party field in the form for the displayed one or more form fields, wherein said third-party field comprises at least one option; and
finalizing the viewing permission of the field value of the displayed one or more form fields of form data, wherein the field value of form data is configured to correspond to the at least one option of the selected third-party field, wherein the viewing permission of the field value of the field of form data corresponding to each option of each third-party field is authorized respectively and the field value of the field that does not have the viewing permission is not being displayed to distinguish from the field and the field value having the viewing permission;
wherein one role is independent which is not a group or class, the one role is configured to be related to a user only during a same period, the user is configured to be related to the one role or more roles, and the user is configured to obtain the viewing permission of the related one role or more roles.

8. A method for authorizing a field value of a form field by means of a third-party field, comprising:
selecting a grantee, wherein the grantee comprises a role, the role belongs to a certain department, the role is unique under the department, the role is authorized according to the work content of the role;
selecting a form to be authorized, and displaying one or more form fields for control authorization to modify a field value of the displayed one or more form fields by means of the third-party field in the form; and
selecting the third-party field in the form from the selected form for the displayed field, wherein said selected third-party field comprises at least one option; and
authorizing a modification permission of the field value of the displayed form field of form data, wherein the field value of form data is configured to correspond to the at least one option of the selected third-party field, wherein the modification permission of the field value of the field of form data corresponding to each option of each third-party field is authorized respectively and the field value of the field that does not have the modification permission is being presented in a way to distinguish from the field and the field value having the modification permission;
wherein one role is independent which is not a group or class, the one role is configured to be related to a user only during a same period, the user is configured to be related to the one role or more roles, and the user is configured to obtain the viewing permission of the related one role or more roles.

* * * * *